(12) United States Patent
Cong et al.

(10) Patent No.: US 9,540,531 B2
(45) Date of Patent: Jan. 10, 2017

(54) RADIATION CURABLE INK COMPOSITIONS

(71) Applicant: Electronics for Imaging, Inc., Fremont, CA (US)

(72) Inventors: Lianhui Cong, Concord, NH (US); Terrill Scott Clayton, Gilford, NH (US)

(73) Assignee: Electronics for Imaging, Inc., Fremont, CA (US)

( * ) Notice: Subject to any disclaimer, the term of this patent is extended or adjusted under 35 U.S.C. 154(b) by 0 days.

(21) Appl. No.: 14/958,176

(22) Filed: Dec. 3, 2015

(65) Prior Publication Data

US 2016/0312052 A1 Oct. 27, 2016

Related U.S. Application Data

(60) Provisional application No. 62/151,933, filed on Apr. 23, 2015.

(51) Int. Cl.
| | | |
|---|---|---|
| *C08F 2/46* | (2006.01) | |
| *C08F 2/50* | (2006.01) | |
| *C09D 11/38* | (2014.01) | |
| *C09D 11/101* | (2014.01) | |

(52) U.S. Cl.
CPC ............ *C09D 11/38* (2013.01); *C09D 11/101* (2013.01)

(58) Field of Classification Search
CPC ............................... C09D 11/38; C09D 11/101
USPC ................. 522/64, 6, 71, 189, 184, 1; 520/1
See application file for complete search history.

(56) References Cited

U.S. PATENT DOCUMENTS

| | | | | |
|---|---|---|---|---|
| 4,980,275 A | * | 12/1990 | Goddard | .......... C07F 9/657127 430/372 |
| 8,889,232 B2 | | 11/2014 | Cong | |
| 2011/0074897 A1 | * | 3/2011 | Araki | ................... C09D 11/101 347/102 |
| 2012/0123010 A1 | | 5/2012 | Shukla | |
| 2012/0142809 A1 | | 6/2012 | Oberski et al. | |

FOREIGN PATENT DOCUMENTS

EP 0725108 A1 8/1996

OTHER PUBLICATIONS

Ligon, S.C., et al., "Strategies to Reduce Oxygen Inhibition in Photoinduced Polymerization" Chemical Reviews, vol. 114, No. 1, 2014, pp. 557-589.

* cited by examiner

*Primary Examiner* — Ling Choi
*Assistant Examiner* — Jessica E Whiteley
(74) *Attorney, Agent, or Firm* — Perkins Coie LLP; Viola T. Kung

(57) ABSTRACT

This invention relates to radiation curable ink compositions comprising one or more mono-functional monomers, optionally one or more oligomers, one or more antioxidants capable to react with peroxy radicals to generate radicals to propagate polymerization, and one or more photoinitiators comprising at least an acylphosphine oxide, wherein the ratio of the antioxidants to acylphpsphine is 1:1 to 1:20 by weight. The ink composition provides tack-free surface cure without requiring nitrogen or other inert gas during curing.

15 Claims, No Drawings ary application No. 62/151,933, filed Apr. 23, 2015, which is incorporated herein by reference in its entirety.

RADIATION CURABLE INK COMPOSITIONS

This patent application claims priority from U.S. Provisional Application No. 62/151,933, filed Apr. 23, 2015, which is incorporated herein by reference in its entirety.

TECHNICAL FIELD

This invention relates to radiation curable ink compositions. In particular, the ink composition comprises one or more antioxidants capable to react with peroxy radicals to generate radicals to re-initiate polymerization. The ink composition also comprises acylphosphine oxide as one of photoinitiators.

BACKGROUND OF THE INVENTION

In inkjet printing, oxygen inhibition occurs during the curing step; if there is oxygen present at the surface, the oxygen can penetrate into the surface and interfere with the radical polymerization, leaving unreacted monomers and oligomers at the surface. This is the tack that some people feel as they rub a finger across the surface, and may get traces of wet residue on their gloved hand, which is undesirable.

One practice for formulating UV curable inks for inkjet printers is to use photoinitiators with a free radical initiation wavelength range of 250-350 nm in order to overcome oxygen inhibition on the surface of ink films and to achieve good surface curing.

Ultra-violet light-emitting-diode (UV LED) technology offers a number of advantages compared with traditional mercury arc lamps in the curable ink printing environment. However, most cost effective UV LED lamps with adequate power for UV inkjet printing systems are in the range of 375-405 nm in wavelength. Currently, UV LED curing lamp systems lack wavelengths in the range of 250-350 nm and thus do not have the ability to initiate reaction by photoinitiators that require 250-350 nm for photoinitiation. Therefore, UV curable inkjet inks cured with UV LED lamps have poor surface curing due to oxygen inhibition. A current UV LED curable inkjet ink system suffers poor surface cure unless inert gas is used to displace oxygen prior to curing.

Several methods are used to obtain good surface cure for a UV LED lamp with wavelengths of 375-405 nm. Nitrogen inerting or blanketing on the printing areas is an effective way to achieve good surface curing by mitigating oxygen inhibition. However, such approach requires costly and bulky nitrogen generators as well as compressed air, which increases printer cost and adds cost to customers in terms of compressor capacity.

Inkjet inks have very low viscosity, which makes them susceptible to oxygen inhibition due to oxygen diffusion. Thus, one common practice in UV LED ink formulations is to use the combination of multifunctional monomers and additives, such as amine, thiol, ether, etc., to improve the surface curing. Increasing the amount of multi-functional monomers or oligomers can promote crosslinking to reduce the surface tack. However, this approach results in a hard and brittle ink film, which is not suitable for many applications that require flexible ink film. Increasing photoinitiator concentration or LED lamp power have also been used to reduce the surface tack.

The current available technology cannot completely overcome oxygen inhibition and cannot achieve tack-free surface curing, without nitrogen blanketing.

There is a need for a radiation curable ink composition that provides flexible ink film and achieves tack-free surface cure without a need of nitrogen blanketing or expensive LED lamps.

DETAILED DESCRIPTION OF THE INVENTION

The present invention is directed to a radiation curable ink composition which comprises a combination of selected antioxidants with selected photoinitiators to achieve not only tack-free surface cure and also flexible (non-brittle) ink films. The present ink composition reduces costly photoinitiators and additives in the ink composition, and reduces high levels of cross linkers which can result in brittle ink films. The ink composition of the present invention eliminates the need for nitrogen and expensive LED lamps for printing and curing the ink composition.

The radiation curable ink composition of the present invention comprises: (a) 50-80% by weight of one or more mono-functional monomers, (b) 0-25% by weight of one or more oligomers, (c) 0.1-5% by weight of one or more antioxidants capable to react with peroxy radicals to generate radicals to propagate polymerization, and (d) 1-15% by weight of one or more photoinitiators comprising at least an acylphosphine oxide or a polymeric version of acylphosphine oxide, wherein the ratio of the antioxidants to acylphpsphine is 1:1 to 1:20 by weight.

Unless specifically mentioned, all percentages (%) in this application refer to % by weight.

Monomers

The present ink composition comprises (a) 50-80%, preferably 70-80%, by weight of one or more mono-functional monomers. Mono-functional monomers do not crosslink with each other and provide flexibility of ink film after curing. In one embodiment, mono-functional monomers include acrylates or methacrylates. In one embodiment, mono-functional monomers include vinyl caprolatam. In another embodiment, mono-functional monomers include vinyl ether, n-vinylpyrrolidone, and cyclic expoxide. Examples of suitable mono-functional monomers include, but are not limited to, tetrahydrofurfuryl acrylate, alkoxylated tetrahydrofurfuryl methacrylate, vinyl caprolatam, isobornyl acrylate, 2-phenoxyethyl acrylate, 2-(2-ethoxyethoxy)ethyl acrylate, isooctyl acrylate, isodecyl acrylate, lauryl acrylate, stearyl acrylate, cyclic trimethylolpropane formal acrylate, 3,3,5-trimethylcyclohexane acrylate, tertiarybutylcyclohexane acrylate, Genomer 1122 from RAHN, ethyl vinyl ether, N-vinylpyrrolidone, (3,4-epoxycyclohexane) methyl 3,4-epoxycyclohexylcarboxylate, and mono-functional methoxylated PEG (350) acrylate.

In addition to mono-functional monomers, the ink composition may optionally comprises up to 8% (0-8%), preferably up to 5% (0-5%) by weight, of di-functional monomers to speed up the polymerization process. Examples of suitable di-functional monomer include, but not limited to, diacrylate or dimethacrylate of diols and polyetherdiols, such as propoxylated neopentyl glycol diacrylate, 1, 6-hexanediol diacrylate, 1, 6-hexanediol dimethacrylate, 1,3-butylene glycol diacrylate, 1,3-butylene glycol dimethacrylate 1,4-butanediol diacrylate, 1,4-butanediol dimethacrylate, alkoxylated aliphatic diacrylate (e.g. SR9209A), diethylene glycol diacrylate, diethylene glycol dimethacrylate, dipropylene glycol diacrylate, tripropylene glycol diacrylate, triethylene glycol dimethacrylate, alkoxylated hexandiols diacrylates (e.g, SR 562, SR563, SR564 from Sartomer Co., Inc).

The ink composition preferably does not comprises trifunctional, tetra-functional, or multi-functional monomers, because those monomers will crosslink with each other and result in a non-flexible product or a brittle product.

Oligomers

The radiation curable ink composition of the present invention may optionally comprises (b) one or more oligomers up to 25% by weight. Preferably, the oligomer contents are no more than 15% (0-15%) by weight. The oligomer component comprises at least one of an acrylic oligomer, a urethane (meth)acrylate oligomer, a polyester based (meth)acrylate oligomer, a polyether based (meth) acrylate oligomer, or an epoxy (meth)acrylate oligomer.

It is preferable to use an oligomer component of low viscosity, low volatility, high reactivity, low glass transition temperature, and good adhesion to multiple substrates in the ink compositions. The functionality of the oligomer component is preferably not greater than 3, and more preferably not greater than 2. The low functionality contributes to more flexible ink compositions.

Examples of suitable acrylic oligomers include, but are not limited to, those under the designations of CN820, CN152, and CN146, etc. from Sartomer USA, LLC (Exton, Pa.). Examples of suitable urethane (meth)acrylates include, but are not limited to, aliphatic and aromatic urethane (meth)acrylates under the designations of CN991, CN929, CN966, CN981, CN9006, CN9007, CN992, CN994, CN997, CN978, CN1963, etc. from Sartomer USA, LLC, and those from Cytec Surface Specialty, INC. (West Paterson, N.J.) under the designations of EBECRYL 8402, EBECRYL 1290. Examples of suitable polyester or polyether (meth) acrylate oligomers include, but are not limited to, those named below, CN3200, CN2279, and CN2270, etc. (Sartomer USA, LLC.). Examples of suitable epoxy (meth) acrylate oligomers include, but are not limited to, those named below, EBECRYL 3701, EBECRYL 3708, EBECRYL 3200, EBECRYL 3600 from Cytek Surface Specialty, as well as CN151 (Sartomer USA, LLC.)

Anti-Oxidants

The Antioxidants of component (c) of the present ink composition requires selected antioxidants that are capable to react with peroxy radicals and/or hydrogen peroxide to generate radicals to re-initiate polymerization and improve curing. Antioxidants that only inhibit oxygen reaction but do not re-generate active radicals, such as in-can stabilizers, radical scavengers, and oxygen inhibitors (e.g., butylated hydroxytoluene BHT, amines, ether, and thios) are not useful antioxidants for the present invention. The Antioxidants of the present invention is present in an amount of 0.1-5%, preferably 0.5-3% by weight, and work as reducing agents to react with the inactive peroxy radicals to generate active radicals such as oxy radicals. The newly formed active radicals continue to propagate polymerization of the ink components. Because oxy radicals may be less reactive than alkyl radicals, an optimized selection of monomers, oligomers, and photoinitiators may be desirable.

The mechanism of the anti-oxidant reaction is believed to be:

  (i)

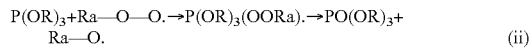  (ii)

In step (i), radical Ra. reacts with oxygen to generate peroxy radicals Ra—O—O., which is not active enough to initiate polymerization. In step (ii), anti-oxidant such as phosphine oxide $P(OR)_3$ reacts with peroxy radicals and first forms an intermediate, and then generates oxy radicals Ra—O., which are active to re-initiate the polymerization.

Preferred antioxidants useful for the present ink composition include phosphines and phosphites. Phosphines useful for the present invention have a general formula of $PR_3$, wherein R is independently H, alkyl, aryl, or halogen, with the proviso that not all R's are H. Phosphites useful for the present invention have a general formula of $P(OR)_3$, wherein R is independently H, alkyl, or aryl, with the proviso that not all R's are H.

Useful phosphines and phosphites include but are not limited to, (a) phosphine, such as triphenyl phosphine (TPP, BASF), diphenylchlorophosphine (DPCP, BASF), and dichlorophenylphosphine (DCPP, BASF); (b) aryl organo phosphites, such as trisnonylphenol phosphite (DOVERPHOS® 4), triphenyl phosphite (DOVERPHOS® 10), diphenyl phosphite (DOVERPHOS® 213), ADK STAB 1178; (c) aryl-alkyl organo phosphites, such as phenyl diisodecyl phosphite (DOVERPHOS® 7), diphenyl isodecyl phosphite (DOVERPHOS® 8), diphenyl isooctyl phosphite (DOVERPHOS® 9), tetraphenyl dipropyleneglycol diphosphite (DOVERPHOS® 11), poly(dipropyleneglycol) phenyl phosphite (DOVERPHOS® 12), alkyl ($C_{12}$-$C_{15}$) bisphenol-A phosphite, alkyl (C10) bisphenol-A phosphite, ADK STAB 135A, ADK STAB 2112, ADK STAB 1500, ADK STAB HP-10, and ADK STAB 517; and (d) alkyl organo phosphites such as triisodecyl phosphite, tris (tridecyl) phosphite (DOVERPHOS® 49), trilauryl phosphite, tris (dipropylene glycol) phosphite, dioleyl hydrogen phosphite, and ADK STAB 3010.

Other useful Antioxidants for the present invention include a transition metal complex such as nickel dialkyldithiocarbanates; an organo sulfur compound such as methanesulfenic acid and propane sulfenic acid, and a phenolic compound such as benzyl phenol, methoxybenzyl phenol, ADK STAB AO-30, ADK STAB AO-40, ADK STAB AO-50F, and ADK STAB AO-60.

Photoinitiators

The radiation curable ink composition of the present invention comprises (d) 1-15% by weight of one or more photoinitiators, in which acylphosphine oxide or a polymeric version of acylphosphine oxide is an essential photoinitiator. A polymeric version of acylphosphine oxide as used herein, refers to a polymer made of acylphosphine or a polymer containing acylphosphine functionality in a polymer chain or in the branch of a polymer chain. For example, some acylphosphine oxides can have functional groups such as vinyl groups, which can go through polymerization to form a polymer itself.

The weight ratio of the antioxidants to acylphosphine oxide in the present ink composition is 1:1 to 1:20, or preferably 1:1 to 1:10. In situation where acylphosphine oxide is in a polymer chain, the weight of acylphosphine refers to the weight of the functional group of acylphosphine in the polymer.

Acylphosphine oxide photoinitiators include diphenyl(2,4,6-trimethylbenzoyl)phosphine oxide (TPO), phenylbis(2,4,6-trimethylbenzoyl)-phosphine oxide (Irgacure 819), ethyl (2,4,6-trimethylbenzoyl)-phenylphosphine oxide (L-TPO), and their derivatives and polymeric version derivatives.

In addition to acylphpsphine oxide, the present ink composition may comprise other photoinitiators such as thioxanthones: 2-isopropyl thioxanthone, 2-chlorothioxanthone, 2-methylthioxanthone, 2 ethylthioxanthone, 2-tert-butylthioxanthone, 2-phenylthioxanthone, 2-benzylthioxanthone, 2-benzylthioxanthone, and 4-isopropylthioxanthone, polymeric thioxanthones.

Other useful photoinitiators that may be used in the present ink composition include, but are not limited to, 2-benzyl-2-dimethylamino-1-(4-morpholinophenyl)-butanone-1 (Irgacure 369), 2-methyl-1-[4-(methylthio)phenyl]-2-(4-morpholinyl)-1-propanone (Irgacure 907), 2-(4-methylbenzyl)-2-(dimethylamino)-4-morpholinobutyrophenone (Irgacure 379), 1-hydroxycyclohexylphenyl ketone, 2-hydroxy-4'-(2-hydroxyethoxy)-2-methylpropiophenone, 2-hydroxy-2-methyl-1-phenyl-1-propanone, oligo or dimer (2-hydroxy-2-methyl-1-[4-(1-methylvinyl) phenyl] propanone). Suitable blends of photoinitiators commercially available include, but are not limited to, those under the designations of Darocur 4265, Irgacure 2022, Irgacure 2100 from BASF; and Esacure KT37, Esacure KT55, and Esacure KT0046 from Lamberti®.

Additives

The present ink composition may further include 0.01-5%, preferably 0.1-3% by weight of one or more additive components. Various additives may be included in the ink compositions, including one or more of a surfactant, a leveling additive, a stabilizer, and other suitable additives.

A surfactant is used to reduce the surface tension of the ink compositions to improve wetting property of the inks on substrates. The amount of surfactant in the ink compositions is 0.01-2% by weight, and preferably 0.05-0.5% by weight. It is preferred that the surfactant comprises at least one polysiloxane acrylate, also known as a silicone acrylate, which participates in the radiation curing process to be part of cured ink. Examples of a suitable surfactant include, but are not limited to, those under the designations of TEGORAD 2200N, TEGORAD 2100, and TEGORAD 2300 from Goldschmidt Chemical Corporation (Hopewell, Va.); and BYK 307, BYK 330, BYK 377 and BYK 3510 (BYK CHEMIE GMBH (Wesel, FRG).

A leveling additive may be used to improve the flowing property of ink to produce a more uniform surface of ink film. The amount of leveling agent in the ink compositions is 0.1-2% by weight. Examples of suitable leveling agent include, but are not limited to, those under the designation of BYK 361N, BYK 353, and BYK 354 and so on. (BYK CHEMIE GMBH).

A stabilizer is used to improve the shelf life and photolytic stability of ink compositions. Stabilizers in the ink compositions can include an ultraviolet light stabilizer and hindered amine light stabilizer. These stabilizers are used to improve the outdoor durability and weatherability of cured ink. Commercially available ultraviolet light stabilizers include, but are not limited to, those under the designation of TINUVIN® 460, TINUVIN® 479, TINUVIN® 171, TINUVIN® 928, TINUVIN® 123, and TINUVIN® 292 from Ciba Specialty Chemicals Corp. (BASF AG, Ludwigshafen, FRG). One or more UV inhibitor/stabilizers may be present in the ink compositions. They can be present in the ink compositions in amounts of 0.01%-2% by weight, and more specifically 0.1%-1% by weight.

A free radical scavenger stabilizer is used to improve the stability of ink against heat. Examples of a free radical scavenger include, but are not limited to, hydroquinone, 4-methoxyphenol, hindered phenol, etc. The amount of free radial scavenger stabilizer can be present in ink compositions in 0.05-1% by weight, and more specifically 0.1-0.75% by weight. A small amount is preferably used in the ink compositions to minimize their interference with the radiation curing process. Examples of free radical scavengers include, but are not limited to, hydroquinone, 4-methoxyphenol, hindered phenol such as IRGASTAB® UV 22 (an in-can stabilizer that inhibits early polymerization in UV curable ink and coating formulations) from BASF, and ST-1 (tris(N-nitroso-N-phenyl-hydroxylamine)-aluminum salt+ 92% 2-phenoxyethyl acrylate) (ZXCHEMTECH, Traverse City, Mich.).

Colorant Component

The present ink composition may further comprise a colorant component if color is desired. The colorant can be pigments, dyes, or a combination of pigments and/or dyes. The colorant can be pigments, dyes, or a combination of pigments and/or dyes. The amount of colorant component in the ink compositions is in the range of 0-20% by, more preferably 0-8% by weight. A clear ink has 0% colorant.

Examples of suitable Pigments include, but are not limited to, those under the designation of Pigment Blue 1, Pigment Blue 15, Pigment Blue 15:1, Pigment Blue 15:2, Pigment Blue 15:3, Pigment Blue 15:4, Pigment Blue 15:6, Pigment Blue 16, Pigment Blue 24, and Pigment Blue 60; Pigment Brown 5, Pigment Brown 23, and Pigment Brown 25; Pigment Yellow 3, Pigment Yellow 14, Pigment Yellow 16, Pigment Yellow 17, Pigment Yellow 24, Pigment Yellow 65, Pigment Yellow 73, Pigment Yellow 74, Pigment Yellow 83, Pigment Yellow 95, Pigment Yellow 97, Pigment Yellow 108, Pigment Yellow 109, Pigment Yellow 110, Pigment Yellow 113, Pigment Yellow 120, Pigment Yellow 128, Pigment Yellow 129, Pigment Yellow 138, Pigment Yellow 139, Pigment Yellow 150, Pigment Yellow 154, Pigment Yellow 156, and Pigment Yellow 175; Pigment Green 1, Pigment Green 7, Pigment Green 10, and Pigment Green 36; Pigment Orange 5, Pigment Orange 15, Pigment Orange 16, Pigment Orange 31, Pigment Orange 34, Pigment Orange 36, Pigment Orange 43, Pigment Orange 48, Pigment Orange 51, Pigment Orange 60, and Pigment Orange 61; Pigment Red 4, Pigment Red 5, Pigment Red 7, Pigment Red 9, Pigment Red 22, Pigment Red 23, Pigment Red 48, Pigment Red 48:2, Pigment Red 49, Pigment Red 112, Pigment Red 122, Pigment Red 123, Pigment Red 149, Pigment Red 166, Pigment Red 168, Pigment Red 170, Pigment Red 177, Pigment Red 179, Pigment Red 190, Pigment Red 202, Pigment Red 206, Pigment Red 207, and Pigment Red 224; Pigment Violet 19, Pigment Violet 23, Pigment Violet 37, Pigment Violet 32, Pigment Violet 42; and Pigment Black 6 or 7 (The Colour Index, Vols. 1-8, by the Society of Dyers and Colourists, Yorkshire, England), Black PB 2 and 5; carbon black; titanium dioxide (including rutile and anatase); zinc sulfide, and the like or a mixture thereof.

If pigment is used in the ink compositions, preferably, the pigment is pre-dispersed prior to incorporation, generally into one or more of the monomer and/or oligomer components used in the ink compositions. In embodiments, the colorant is added as a pigment slurry prepared with a portion of a reactive diluent such as propoxylated 2-neopentyl glycol diacrylate (SR-9003, Sartomer USA, LLC), isobornyl acrylate etc. Dispersion agents generally are used to improve the stability of dispersion by reducing or avoiding the possibility of pigment particle settling or agglomerating. Examples of suitable dispersion agents include, but are not limited to, those under the designations of Solsperse 32000 from Lubrizol® Advanced Materials, and DisperBYK 111 and DisperBYK180 from Byk Chemi®. The pigment in the dispersion can be 20-80% by weight. Other additives such as stabilizers, flowing additive, etc. can be incorporated during the dispersion process to improve the stability of dispersion.

In embodiments, the colorant is added as a pigment slurry prepared with a portion of a reactive diluent such as propoxylated 2-neopentyl glycol diacrylate (SR-9003, SARTOMER USA, LLC), isobornyl acrylate etc.

The present ink compositions have viscosity suitable for ink-jet printing. They have a viscosity no greater than 40 cP at 25° C., and preferably no greater than 30 cP at 25° C.

Application

The ink compositions can be printed with an ink jet printer. Any conventional ink jet printer is acceptable.

In one embodiment, the ink jet printer includes a component for radiation curing of the ink. In another embodiment, the radiation curing component is a separate assembly. Non-limiting examples of suitable radiation sources for UV curing include high-pressure or low-pressure mercury vapor lamps such as LED lamps, with or without doping, or electron beam sources. Examples of LED Lamps usable according to the technique include 250 nm-405 nm, preferably 360-405 nm. Mercury arc lamps can also be used. Their arrangement is known in principle and may be adapted to the circumstances of the substrate for printing and the process parameters.

The invention is further illustrated by the following examples.

EXAMPLES

Example 1

Cyan Ink Composition

Table 1 shows the components for a cyan ink composition.

TABLE 1

| Trade Name | Chemical | Cyan Ink weight % |
|---|---|---|
| SR531 | CTFA (cyclic trimethylolpropane formal acrylate, mono-functional monomer) | 24.65 |
| SR339 | PEA (2-phenoxyethyl acrylate, mono-functional monomer) | 25.5 |
| SR506 | IBOA (isobornyl acrylate, mono-functional monomer) | 12.0 |
| CN991 | Urethane Acrylate Oligomer | 10.0 |
| V-Cap | N-Vinyl Caprolactam (mono-functional monomer) | 9.50 |
| SR9003 | PONPGDA (difunctional monomer) | 3.0 |
| BYK-361N | Polyacrylate Additive | 0.50 |
| BYK-377 | Polyester Modified Polydimethyl Siloxane (Surfactant) | 0.050 |
| Irgastab UV22 | In-can stabilizer | 1.0 |
| DOVERPHOS ® 12 | Phosphite (Anti-Oxidant) | 2.0 |
| Genocure TPO | Acylphosphine Oxide, MAPO (photoinitiator) | 10.0 |
| Cyan pigments | Pigments | 1.8 |
| | | 100.0 |

The above ingredients (chemicals) were added to a container in the order according to the list of Table 1, and mixed by magnetic or mechanic mixers while adding to form the cyan ink.

Example 2

Curing Testing of Ink of the Present Invention

The cyan ink of Example 1 was cured under a 7 W 395 nm UV LED lamp (six passes at the speed of 40 inch/min) without requiring nitrogen blanketing on the surface of the curing area.

The curing testing was conducted on a pressure-sensitive-adhesive (PSA) vinyl substrate, 3M 180-10 Controltac produced by 3M®. The thickness of ink film was 15 micrometers prepared by using #6 wired rod. The ink film was then cured using a conveyor belt pass through under the UV lamp.

The elongation was measured using a tensile tester from COM-TEN, Model: 95 Series. The ink sample was cut into strips with 1 inch width, and placed in the two clamps, which was set 2 inches apart. The speed crosshead was 12 inches/min, and the test was stopped when the sample broke. The elongation was measured at the point when the ink film starts to crack.

The adhesion measurement was based on ASTM D 3359. The test was conducted by cutting a cross-hatch pattern on the ink sample and applies a suitable tape, e.g., PERMACEL® 99 adhesion test tape from PERMACEL® over the crosshatch area. The tape was rubbed firmly to remove any trapped air bubbles to ensure full contact, and the tape was then rapidly pulled off close to an angle of 18. The crosshatch area was evaluated based on ASTM D 3359 method B.

The tested results are summarized as follow.

Viscosity: 12 cps at 45° C.
Curing energy: 360 mj/cm$^2$ UVV
Adhesion: 5
Elongation: 135%
Surface scratch resistance: 5 (0-5 rating. 5 is best indicating no ink is scratched off from the substrate by finger nail or nickel)
Surface Tack: 5 (0-5 rating. 5 is best indicating no tack feel by pressing the surface with fingers or hands)

While the invention has been particularly shown and described with reference to a preferred embodiment and various alternate embodiments, it will be understood by persons skilled in the relevant art that various changes in form and details can be made therein without departing from the scope of the invention. All printed patents and publications referred to in this application are hereby incorporated herein in their entirety by this reference.

What is claimed is:

1. A radiation curable ink composition, comprising:
   (a) 50-80% by weight of one or more mono-functional monomers,
   (b) 0-25% by weight of one or more oligomers,
   (c) 0.1-5% by weight of one or more antioxidants selected from the group consisting of phosphines and phosphites capable to react with peroxy radicals to generate active radicals to propagate polymerization, and
   (d) 1-15% by weight of one or more photoinitiators comprising at least an acylphosphine oxide or a polymeric version of acylphosphine oxide,
   wherein the ratio of the one or more antioxidants to the acylphosphine oxide is 1:1 to 1:20 by weight.

2. The ink composition of claim 1, wherein the phosphine has a chemical formula of $PR_3$, wherein R is independently H, alkyl, aryl, or halogen, with the proviso that not all R's are H.

3. The ink composition of claim 1, wherein the phosphite is an aryl organo phosphite, an alkyl organo phosphite, or an aryl-alkyl organo phosphite.

4. The ink composition of claim 1, wherein the one or more antioxidants are in an amount of 0.5-3% by weight.

5. The ink composition of claim 1, wherein the one or more photoinitiators comprises at least an acylphosphine oxide.

6. The ink composition of claim 1, wherein the one or more photoinitiators are in an amount of 5-15% by weight.

7. The ink composition of claim 1, wherein the ratio of the one or more antioxidants are acylphosphine oxide is 1:1 to 1:10 by weight.

8. The ink composition of claim 1, further comprising 0-8% by weight of one or more difunctional monomers.

9. The ink composition of claim 1, wherein the one or more mono-functional monomers are in an amount of 70-80% by weight.

10. The ink composition of claim 1, wherein the one or more oligomers are in an amount of 5-15% by weight.

11. The ink composition of claim 1, further comprising 0.01-5% by weight of one or more additives.

12. The ink composition of claim 11, wherein the additive is a surfactant, a leveling additive, or a stabilizer.

13. The ink composition of claim 1, further comprising 0-20% by weight of one more colorant components.

14. The ink composition of claim 1, wherein the ink viscosity is not greater than 40 cP at 25° C.

15. The ink composition of claim 1, wherein the phosphite has a general formula of $P(OR)_3$, wherein R is independently H, alkyl, or aryl, with the proviso that not all R's are H.

* * * * *